(12) United States Patent
ElDelgawy

(10) Patent No.: US 10,923,159 B1
(45) Date of Patent: Feb. 16, 2021

(54) EVENT DETECTION THROUGH VARIABLE BITRATE OF A VIDEO

(71) Applicant: Alarm.com Incorporated, Tysons, VA (US)

(72) Inventor: Ramy Samir Aziz ElDelgawy, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/718,589

(22) Filed: Dec. 18, 2019

Related U.S. Application Data

(60) Provisional application No. 62/788,352, filed on Jan. 4, 2019.

(51) Int. Cl.
*G11B 27/34* (2006.01)
*G11B 27/11* (2006.01)

(52) U.S. Cl.
CPC ............ *G11B 27/34* (2013.01); *G11B 27/11* (2013.01)

(58) Field of Classification Search
USPC .................... 386/223–224, 226, 228–229
See application file for complete search history.

(56) References Cited

U.S. PATENT DOCUMENTS

| | | | |
|---|---|---|---|
| 2018/0191796 A1* | 7/2018 | Gandhi | H04N 21/251 |
| 2019/0140929 A1* | 5/2019 | Ruelle | G06N 20/00 |
| 2019/0197702 A1* | 6/2019 | Edpalm | H04L 65/607 |

* cited by examiner

*Primary Examiner* — Hung Q Dang
(74) *Attorney, Agent, or Firm* — Fish & Richardson P.C.

(57) ABSTRACT

Methods and systems including computer programs encoded on a computer storage medium, for event detection through variable bitrate of a video. A method includes obtaining bitrate information that describes bitrates for portions of a video, determining bitrate criteria that corresponds to a likely occurrence of an event being shown in the video, determining that the bitrate indicated by the bitrate information for a particular portion of the video satisfies the bitrate criteria, in response to determining that the bitrate indicated by the bitrate information for the particular portion of the video satisfies the bitrate criteria, determining that an instance of the event is likely to be shown in the particular portion of the video, and providing a user device an indication that the event is likely to be shown in the particular portion of the video.

20 Claims, 3 Drawing Sheets

EVENT DETECTION THROUGH VARIABLE BITRATE OF A VIDEO

CROSS-REFERENCE TO RELATED APPLICATIONS

This application claims the benefit of U.S. Provisional Application No. 62/788,352, filed Jan. 4, 2019, which is incorporated by reference in its entirety.

TECHNICAL FIELD

This disclosure relates to property monitoring technology.

BACKGROUND

Many people equip homes and businesses with monitoring systems to provide increased security for their homes and businesses. These monitoring systems may include security cameras.

SUMMARY

Techniques are described for event detection through variable bitrate of a video. Cameras may use either a constant bit rate or a variable bitrate when the video is encoded. A variable bitrate may allow a higher bitrate to be allocated on complex scenes and lower bitrate for simple scenery. For a camera that has a set resolution, frames per second, image quality, Group of Video (GOV) length and I-frame interval, one thing that may vary the bitrate is the scene complexity. An example of that may be lighting changes and/or motion occurrence in the scenery that the camera is pointed at.

A camera recording to a video recorder that stores the recorded video on a mass storage device may be used in residential and commercial venues. Users may review the stored video whenever they wish. The video recorder and the camera may be on the same user's local network, so storing video recorded by the camera may require no internet access. Additionally, a user device used by the user to view video stored on the video recorder may similarly not require internet access when the user device is on the same user's local network.

A video recorder may detect and monitor the bitrate of video coming from a camera. The video recorder may store bitrate information of a camera recording to it for an interval of time. A server remote from a property may send a common gateway interface (CGI) command to the video recorder to retrieve this bitrate information for the camera and determine from the bitrate information when motion or a significant change in scenery is likely to have occurred in the field of view (FOV) of that camera. The server may then provide an indication to a user device to save a user time from having to scroll through video to attempt to find when interesting events occurred. Accordingly, the user may then quickly view a portion of the video where an event was determined to have likely occurred based on the bitrate information.

A system that includes such a camera, video recorder, and server may provide various advantages. For example, users may be limited in an amount of video that may be uploaded to the server but the server may perform visual object detection and/or recognition in video to determine when events likely occurred. Accordingly, in the example, the video recorder may upload bitrate information and still have the server determine when events likely occurred based on bitrate information without needing the video to be uploaded to the server.

In another example, some users may be unwilling to have video from the camera stored on the server. Accordingly, having the video recorder provide the bitrate information to the server without the video may enable a user to ensure that video does not leave their local network. In yet another example, complicated network restrictions for a local network, e.g., firewall restrictions in a commercial sphere, may prevent the camera from uploading video so having the video recorder upload bitrate information to the server may still allow users to receive indications when events likely occurred in video.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
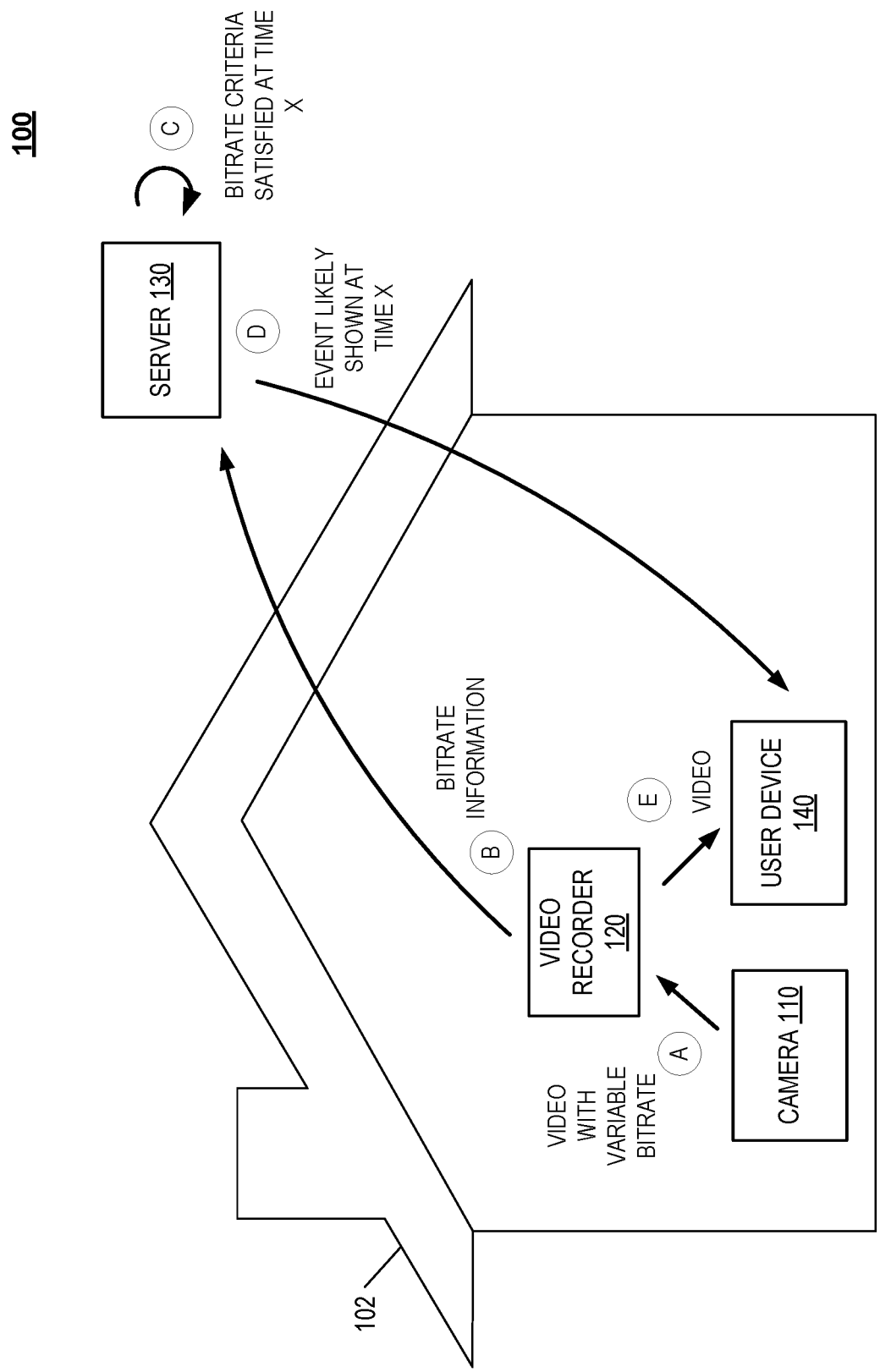
FIG. 1 illustrates an example of a system for event detection through variable bitrate of a video.

FIG. 1 illustrates an example of a system 100 for event detection through variable bitrate of a video. As shown in FIG. 1, the system 100 may include a property 102 (e.g. a home) of a user that is monitored, a camera 110, a video recorder 120, a server 130, and a user device 140. The camera 110 may record video of a scene and encode the video with a variable bitrate. For example, the camera 110 may record video of a scene with a low bitrate, e.g., around six hundred kilobits per second (kbps) when there are no changes shown in the scene and the camera 110 may record video of the scene with a higher bitrate, e.g., around seven hundred kbps, when there are changes shown in the scene. The camera 110 may provide to video to the video recorder 120. For example, the camera 110 may establish a connection with the video recorder 120 over a local area network within the property 102 and provide a video stream over the connection.

The video recorder 120 may receive the video from the camera 110, determine bitrates of portions of the video, store the video, provide bitrate information to the server 130, and provide the video to the user device 140. For example, the video recorder 120 may receive a video stream from the camera 110 where a first part of the video stream shows no changes in a scene and is encoded with a bitrate of around six hundred kbps and where a second part of the video stream shows changes in the scene and is encoded with a bitrate of around seven hundred kbps.

In some implementations, the video recorder 120 may determine the bitrate of portions of the video from metadata included in the video. For example, the video stream received by the video recorder 120 may include metadata that indicates bitrates of various portions of the video stream and the video recorder 120 may determine the bitrates from the metadata. In some implementations, the video recorder 120 may determine the bitrate of portions of the video from network bandwidth usage. For example, the video recorder 120 may determine that the video recorder 120 is receiving a portion of a video stream while network bandwidth usage between the camera 110 and the video recorder 120 is six hundred kbps and, in response, determine that the bitrate of the video is six hundred kbps.

The video recorder 120 may include non-transitory medium that may store the video and bitrate information that indicates bitrates of the video. For example, the video recorder 120 may include hard drives and/or random access memory.

The video recorder 120 may provide the bitrate information that it determines to the server 130. For example, the video recorder 120 may indicate that during a first portion of a video stream the bitrate was six hundred kbps and during a second portion of the video stream the bitrate was seven hundred kbps. In some implementations, the video recorder 120 may provide the bitrate information to the server 130 in response to receiving a request for the bitrate information. For example, the video recorder 120 may receive a request for the server 130 for any bitrate information determined for video that was not previously provided to the server 130. In some implementations, the video recorder 120 may provide the server 130 the bitrate information without requests from the server 130. For example, the video recorder 120 may push the bitrate information to the server 130 once the video recorder 120 determines the bitrate for video received from the camera 110, without having the server 130 request the bitrate information after the video is received from the camera 110.

The video recorder 120 may provide video to the user device 140. For example, the video recorder 120 may receive a request from the user device 140 for a first portion of video stored by the video recorder 120 and, in response, access the first portion of video from storage and transmit the first portion of video to the user device 140.

The server 130 may receive bitrate information from the video recorder 120, determine whether an event is likely to be shown in a portion of video based on the bitrate information, and provide the user device 140 an indication that the event is likely to be shown in the particular portion of the video, all without receiving the video itself. For example, the server 130 may receive bitrate information from the video recorder 120 that indicates that a first portion of a video stream has a bitrate of six hundred kbps and a second portion of the video stream immediately after the first portion has a bitrate of seven hundred kbps, determine that motion is likely to be shown in the second portion of the video stream based on the bitrate information, and provide the user device 140 an indication that motion is likely to be shown in the second portion.

The server 130 may determine an event is likely to be shown in a portion of video based on bitrate criteria that corresponds to a likely occurrence of an event being shown in the video being satisfied by the bitrate information. For example, the bitrate criteria may be kbps increasing by more than 10%, 12%, 15%, or some other percentage, kbps increasing by at least fifty, sixty, one hundred, or some other kbps, or some other criteria. In the example, the server 130 may determine that as the bitrate of seven hundred of a second portion increased by more than 10% from a bitrate of six hundred of a first portion, the bitrate criteria is satisfied and motion is likely shown in the second portion. In another example, the server 130 may determine that as the bitrate of seven hundred of a second portion increased by more than eighty kbps from a bitrate of six hundred of a first portion, the bitrate criteria is satisfied and significant changes in a scene are likely shown in the second portion.

In yet another example, the server 130 may determine that as the bitrate of seven hundred of a second portion increased by more than one hundred fifty kbps from an average bitrate of five hundred kbps for a prior week's worth of video from the camera 110, the bitrate criteria is satisfied and significant changes in a scene are likely shown in the second portion. In the yet another example, the server 130 may also determine that as the bitrate of six hundred of a first portion increased by less than one hundred fifty kbps from an average bitrate of five hundred kbps for a prior week's worth of video from the camera 110, the bitrate criteria is not satisfied and no significant changes in a scene are likely shown in the first portion.

In some implementations, the server 130 may determine the bitrate criteria from historical information. For example, the server 130 may determine an average bitrate of video from the camera 110 across a few hours, days, or weeks and determine increases from the average bitrate and current bitrate of video.

The server 130 may determine the bitrate criteria based on user input. For example, the server 130 may receive user input that specifies that the bitrate criteria is an increase of fifty kbps or an increase of 10% in kbps. In another example, the server 130 may receive user input that specifies that an event occurred during a particular portion of a video, determine a bitrate for that particular portion, determine a bitrate for a prior portion of the video, and determine a difference between the bitrates as the bitrate criteria.

In some implementations, the bitrate criteria may include a time component. For example, the bitrate criteria may be that a bitrate has decreased by more than 50% from an average for at least five minutes. Such a bitrate criteria may indicate that there is a problem with the camera 110. For example, something may have been placed in front of the camera 110 to block a scene that was previously captured by the camera 110 or the camera 110 may have been accidentally knocked by someone to face a wall.

The user device 140 may receive an indication that an event is likely shown in a portion of video, receive the portion of the video from the video recorder 120, and display the portion of the video. For example, the user device 140 may receive an indication "motion likely detected at time X," display the indication with the user along with a prompt of "would you like to view video for time X?," in response to receiving input from the user to video the video for time X, provide a request to the video recorder for the video for time X, receive the video for time X, and display the video for time X. In another example, the user device 140 may receive an indication "something might be blocking your camera, was this expected and/or do you want to see video from your camera?"

Accordingly, in one example as shown in FIG. 1, the camera 110 may provide, to the video recorder 120, video with the first five minutes showing no changes in a scene with a bitrate of three hundred kbps and with the twenty seconds showing changes in the scene with a bitrate of five hundred kbps (A), the video recorder 120 may determine bitrate information from the video and provide the bitrate information to the server 130 (B), the server 130 may determine that bitrate criteria that corresponds to a likely occurrence of significant changes in a scene being shown is satisfied by the increase from three hundred kbps to five hundred kbps for the twenty seconds (C), the server 130 may provide the user device 140 an indication that significant changes are likely shown for the twenty seconds (D), and the user device 140 may then request and receive video for the twenty seconds from the video recorder 120 (E).

Figure 2:
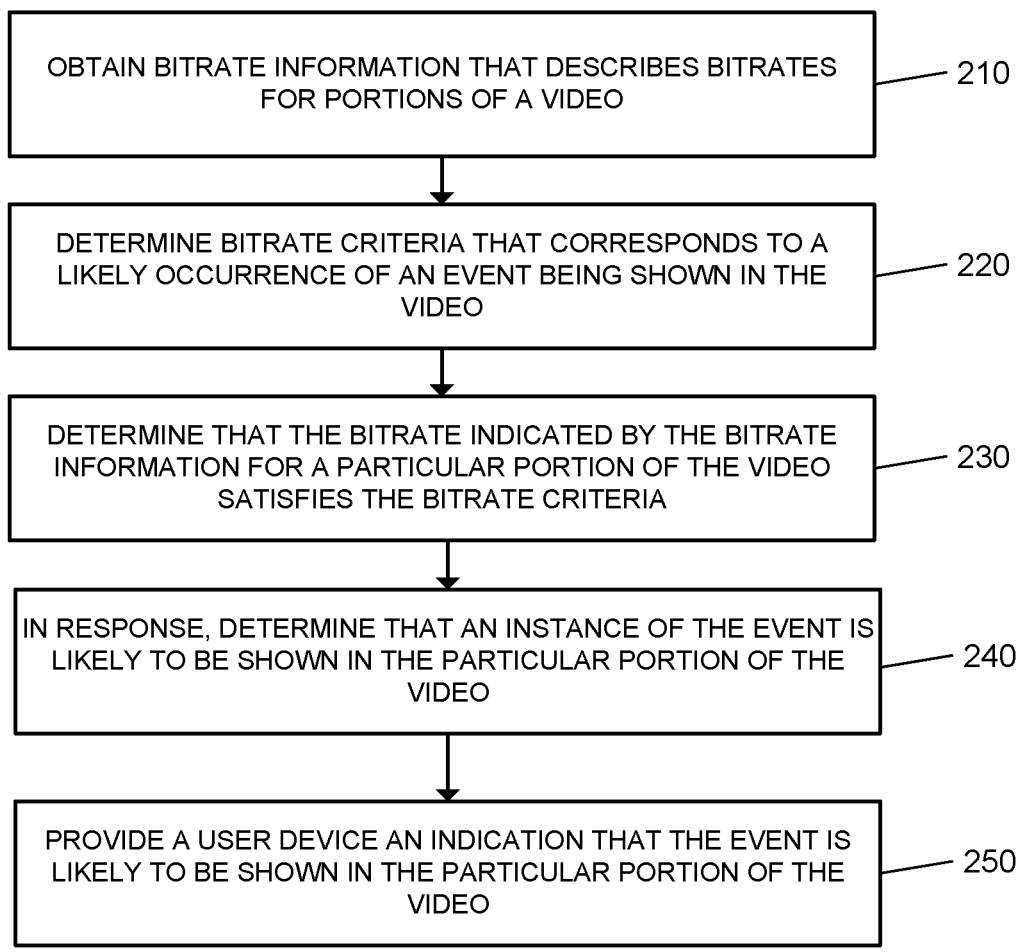
FIG. 2 is a flow chart of an example process for event detection through variable bitrate of a video.

FIG. 2 is a flow chart of an example process 200 for event detection through variable bitrate of a video. The process 200 may be performed by the system 100, or some other system. Generally, the process 200 includes obtaining bitrate information that describes bitrates for portions of a video (210), determining bitrate criteria that corresponds to a likely occurrence of an event being shown in the video (220), determining that the bitrate indicated by the bitrate information for a particular portion of the video satisfies the bitrate criteria (230), in response, determining that an instance of the event is likely to be shown in the particular portion of the video (240), and providing a user device an indication that the event is likely to be shown in the particular portion of the video (250).

Describing in more detail, the process 200 includes obtaining bitrate information that describes bitrates for portions of a video (210). For example, the server 130 may receive bitrate information that describes a size for every frame of the video. In some implementations, obtaining bitrate information that describes bitrates for portions of a video includes obtaining bitrate information that describes a first bitrate for a first portion of the video and obtaining bitrate information that describes a second bitrate for a second portion of the video that occurs after the first portion of the video, where the second bitrate is higher than the first bitrate.

For example, the server 130 may obtain bitrate information from the video recorder 120 that indicates that video was newly received where three minutes was encoded at about four hundred kbps and a next minute was encoded at about five hundred kbps. In another example, the server 130 may obtain bitrate information from the video recorder 120 that indicates that video was newly received where ten minutes was encoded at about three hundred kbps and a next minute was encoded at about six hundred kbps.

The process 200 includes determining bitrate criteria that corresponds to a likely occurrence of an event being shown in the video (220). In some implementations, determining bitrate criteria that corresponds to a likely occurrence of an event being shown in the video includes receiving input from a user that specifies that an increase in the bitrate of the video of at least a predetermined percentage within a predetermined length of time corresponds to a likely occurrence of an event. For example, the server 130 may determine from prior user input that bitrate criteria that corresponds to a likely occurrence of motion being shown in the video is when bitrate increases 20% from an average of bitrate for a prior minute.

In some implementations, determining bitrate criteria that corresponds to a likely occurrence of an event being shown in the video includes receiving input from a user that specifies that an increase in the bitrate of the video corresponds to a likely occurrence of an event. For example, the server 130 may determine from prior user input that bitrate criteria that corresponds to a likely occurrence of motion being shown in the video is when bitrate increases seventy kbps from an average of bitrate for a prior day of video from the camera 110. In some implementations, determining bitrate criteria that corresponds to a likely occurrence of an event being shown in the video includes determining bitrate criteria that corresponds to a likely occurrence of a change in what is shown in the video. For example, the event may be movement of an object shown in the video.

The process 200 includes determining that the bitrate indicated by the bitrate information for a particular portion of the video satisfies the bitrate criteria (230). For example, the server 130 may determine that bitrate of five hundred kbps for the next minute after three minutes of video encoded at four hundred kbps satisfies the bitrate criteria.

The process 200 includes, in response, determining that an instance of the event is likely to be shown in the particular portion of the video (240). For example, the server 130 may determine that in response to the bitrate of five hundred kbps for the next minute after three minutes of video encoded at four hundred kbps satisfying the bitrate criteria, the next minute likely shows motion.

The process 200 includes providing a user device an indication that the event is likely to be shown in the particular portion of the video (250). For example, the server 130 may provide the user device 140 an indication that motion was detected as likely occurring at a particular time in the video. In some implementations, providing a user device an indication that the event is likely to be shown in the particular portion of the video includes providing an indication that a minute of the video, after the bitrate information for the particular portion of the video satisfies the bitrate criteria, is likely to show a change in what is shown in the video. For example, the server 130 may provide the user device 140 an indication that the next minute likely shows motion.

In some implementations, the process 200 includes determining that the bitrate indicated by the bitrate information for a second particular portion of the video satisfies a second bitrate criteria, in response to determining that the bitrate indicated by the bitrate information for the second particular portion of the video satisfies the second bitrate criteria, determining that an instance of the event is likely to have ended during the second particular portion of the video, and providing the user device a second indication that the event is likely to have ended in the second particular portion of the video. For example, the server 130 may determine that a bitrate increased from three hundred kbps to five hundred kbps for five minutes and then decreased again to three hundred kbps and, in response, provide an indication that motion likely ceased after the bitrate increased for five minutes.

Figure 3:
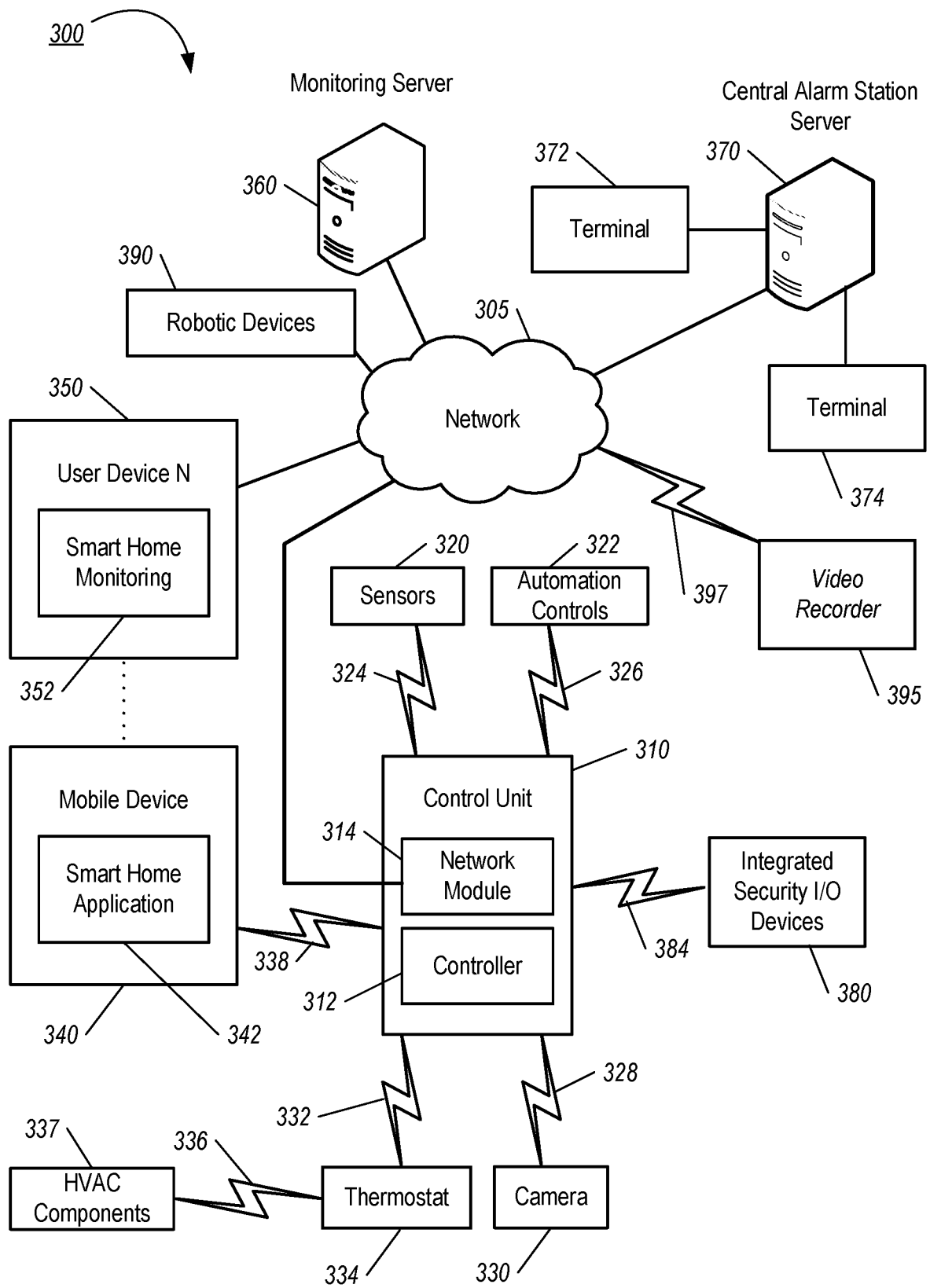
FIG. 3 is an example of a home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data.

Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data. The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312. In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received for the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300 (e.g., user 108). For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The system 300 further includes a video recorder 295 in communication with the control unit 310 through a communication link 397, which similarly to as described above in regards to communication links 324, 326, 328, 332, 338, and 384, may be wired or wireless and include a local network. The video recorder 295 may be the video recorder 120, the camera 330 may be the camera 110, the user device 350 may be the user device 140, and the monitoring server 360 may be the server 130.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving, at a server and from a video recorder at a property, bitrate information that describes bitrates for portions of a video without the server receiving the video;
determining bitrate criteria that corresponds to a likely occurrence of an event being shown in the video;
determining that the bitrate indicated by the bitrate information for a particular portion of the video satisfies the bitrate criteria;
in response to determining that the bitrate indicated by the bitrate information for the particular portion of the video satisfies the bitrate criteria, determining that an instance of the event is likely to be shown in the particular portion of the video; and
providing, by the server, a user device an indication that the event is likely to be shown in the particular portion of the video, wherein the user device receives the video from the video recorder based on receipt of the indication from the server.

2. The method of claim 1, wherein determining bitrate criteria that corresponds to a likely occurrence of an event being shown in the video comprises:
receiving input from a user that specifies that an increase in the bitrate of the video corresponds to a likely occurrence of an event.

3. The method of claim 1, wherein determining bitrate criteria that corresponds to a likely occurrence of an event being shown in the video comprises:
receiving input from a user that specifies that an increase in the bitrate of the video of at least a predetermined percentage within a predetermined length of time corresponds to a likely occurrence of an event.

4. The method of claim 1, wherein determining bitrate criteria that corresponds to a likely occurrence of an event being shown in the video comprises:
determining bitrate criteria that corresponds to a likely occurrence of a change in what is shown in the video.

5. The method of claim 1, wherein providing a user device an indication that the event is likely to be shown in the particular portion of the video comprises:
providing an indication that a minute of the video after the bitrate information for the particular portion of the video satisfies the bitrate criteria is likely to show a change in what is shown in the video.

6. The method of claim 1, wherein obtaining bitrate information that describes bitrates for portions of a video comprises:
obtaining bitrate information that describes a first bitrate for a first portion of the video; and
obtaining bitrate information that describes a second bitrate for a second portion of the video that occurs after the first portion of the video, where the second bitrate is higher than the first bitrate.

7. The method of claim 1, comprising:
determining that the bitrate indicated by the bitrate information for a second particular portion of the video satisfies a second bitrate criteria;
in response to determining that the bitrate indicated by the bitrate information for the second particular portion of the video satisfies the second bitrate criteria, determining that an instance of the event is likely to have ended during the second particular portion of the video; and
providing the user device a second indication that the event is likely to have ended in the second particular portion of the video.

8. A system comprising:
one or more computers and one or more storage devices storing instructions that are operable, when executed by the one or more computers, to cause the one or more computers to perform operations comprising:
receiving, at a server and from a video recorder at a property, bitrate information that describes bitrates for portions of a video without the server receiving the video;
determining bitrate criteria that corresponds to a likely occurrence of an event being shown in the video;
determining that the bitrate indicated by the bitrate information for a particular portion of the video satisfies the bitrate criteria;
in response to determining that the bitrate indicated by the bitrate information for the particular portion of the video satisfies the bitrate criteria, determining that an instance of the event is likely to be shown in the particular portion of the video; and
providing, by the server, a user device an indication that the event is likely to be shown in the particular portion of the video, wherein the user device receives the video from the video recorder based on receipt of the indication from the server.

9. The system of claim 8, wherein determining bitrate criteria that corresponds to a likely occurrence of an event being shown in the video comprises:
receiving input from a user that specifies that an increase in the bitrate of the video corresponds to a likely occurrence of an event.

10. The system of claim 8, wherein determining bitrate criteria that corresponds to a likely occurrence of an event being shown in the video comprises:
receiving input from a user that specifies that an increase in the bitrate of the video of at least a predetermined percentage within a predetermined length of time corresponds to a likely occurrence of an event.

11. The system of claim 8, wherein determining bitrate criteria that corresponds to a likely occurrence of an event being shown in the video comprises:
determining bitrate criteria that corresponds to a likely occurrence of a change in what is shown in the video.

12. The system of claim 8, wherein providing a user device an indication that the event is likely to be shown in the particular portion of the video comprises:
providing an indication that a minute of the video after the bitrate information for the particular portion of the video satisfies the bitrate criteria is likely to show a change in what is shown in the video.

13. The system of claim 8, wherein obtaining bitrate information that describes bitrates for portions of a video comprises:
obtaining bitrate information that describes a first bitrate for a first portion of the video; and
obtaining bitrate information that describes a second bitrate for a second portion of the video that occurs after the first portion of the video, where the second bitrate is higher than the first bitrate.

14. The system of claim 8, the operations comprising:
determining that the bitrate indicated by the bitrate information for a second particular portion of the video satisfies a second bitrate criteria;
in response to determining that the bitrate indicated by the bitrate information for the second particular portion of the video satisfies the second bitrate criteria, determining that an instance of the event is likely to have ended during the second particular portion of the video; and
providing the user device a second indication that the event is likely to have ended in the second particular portion of the video.

15. A non-transitory computer-readable medium storing software comprising instructions executable by one or more computers which, upon such execution, cause the one or more computers to perform operations comprising:
receiving, at a server and from a video recorder at a property, bitrate information that describes bitrates for portions of a video without the server receiving the video;
determining bitrate criteria that corresponds to a likely occurrence of an event being shown in the video;
determining that the bitrate indicated by the bitrate information for a particular portion of the video satisfies the bitrate criteria;
in response to determining that the bitrate indicated by the bitrate information for the particular portion of the video satisfies the bitrate criteria, determining that an instance of the event is likely to be shown in the particular portion of the video; and
providing, by the server, a user device an indication that the event is likely to be shown in the particular portion of the video, wherein the user device receives the video from the video recorder based on receipt of the indication from the server.

16. The medium of claim 15, wherein determining bitrate criteria that corresponds to a likely occurrence of an event being shown in the video comprises:
receiving input from a user that specifies that an increase in the bitrate of the video corresponds to a likely occurrence of an event.

17. The medium of claim 15, wherein determining bitrate criteria that corresponds to a likely occurrence of an event being shown in the video comprises:
receiving input from a user that specifies that an increase in the bitrate of the video of at least a predetermined percentage within a predetermined length of time corresponds to a likely occurrence of an event.

18. The medium of claim 15, wherein determining bitrate criteria that corresponds to a likely occurrence of an event being shown in the video comprises:
determining bitrate criteria that corresponds to a likely occurrence of a change in what is shown in the video.

19. The medium of claim 15, wherein providing a user device an indication that the event is likely to be shown in the particular portion of the video comprises:
providing an indication that a minute of the video after the bitrate information for the particular portion of the video satisfies the bitrate criteria is likely to show a change in what is shown in the video.

20. The medium of claim 15, wherein obtaining bitrate information that describes bitrates for portions of a video comprises:
   obtaining bitrate information that describes a first bitrate for a first portion of the video; and
   obtaining bitrate information that describes a second bitrate for a second portion of the video that occurs after the first portion of the video, where the second bitrate is higher than the first bitrate.

\* \* \* \* \*